United States Patent [19]

Hasselman et al.

[11] Patent Number: 5,379,657
[45] Date of Patent: Jan. 10, 1995

[54] MICROGRAVITY SUSPENSION SYSTEM FOR SIMULATING A WEIGHTLESS ENVIRONMENT

[75] Inventors: Timothy K. Hasselman, 2618 Via Rivera, Palo Verdes Estates, Calif. 90274; Richard Quartararo, Laguna Niguel, Calif.

[73] Assignee: Timothy K. Hasselman, Palos Verdes Estates, Calif.

[21] Appl. No.: 902,145

[22] Filed: Jun. 22, 1992

[51] Int. Cl.$^6$ .................. G01M 19/00; B66F 11/00
[52] U.S. Cl. ............................. 73/866.4; 248/329; 248/648
[58] Field of Search .............. 73/866.4, 865.6; 434/302; 248/317, 323, 327, 328, 329, 330.1, 331, 332, 364, 648, 908

[56] References Cited

U.S. PATENT DOCUMENTS

| | | | |
|---|---|---|---|
| 788,150 | 4/1905 | Winn | 248/329 X |
| 3,010,220 | 11/1961 | Schueller | 73/865.6 X |
| 3,196,690 | 7/1965 | Brooks | 73/865.3 |
| 3,298,226 | 1/1967 | Hildebrandt | 73/862.56 X |
| 3,393,889 | 7/1968 | Ogden | 248/331 X |
| 3,421,363 | 1/1969 | Herr | 73/663 |
| 3,516,179 | 6/1970 | Dane | 248/571 X |
| 4,860,600 | 8/1989 | Schumocher | 73/865.6 |
| 4,995,272 | 2/1991 | Reed, III et al. | 73/866.4 X |
| 5,197,341 | 3/1993 | Steeves | 73/866.4 X |
| 5,207,110 | 5/1993 | Chew et al. | 73/866.4 |

FOREIGN PATENT DOCUMENTS

| | | | |
|---|---|---|---|
| 2906105 | 8/1979 | Germany | 248/648 |
| 555314 | 4/1977 | U.S.S.R. | 73/866.4 |

OTHER PUBLICATIONS

Sparta, Inc. and Engineering Mechanics, Associates, Inc., *Proposal to Design, Develop and Demonstrate Microgravity Suspension System*, May 17, 1988 including cover page, pp. i-ii, 1-61,69, Appendix D cover page, & pp. d1-D4.

*Primary Examiner*—Tom Noland
*Attorney, Agent, or Firm*—Fulwider Patton Lee & Utecht

[57] ABSTRACT

A method and system for supporting a test article or structure in a gravity environment for the purpose of testing the article in a simulated weightless condition includes at least one support assembly attached to the article for suspending the article from an overhead support. The support assembly includes three cables each having an end attached to the article. The cables are capable of being actuated to cooperatively maintain a constant resultant vertical force on the test article which is equal to the weight of the article. The system includes a controller which is capable of adjusting the force in each cable to continuously maintain the constant resultant force on the article as it moves from position to position. The controller can calculate the new position of the test article as it moves from position to position. The controller is able to calculate each new position, calculate the forces necessary to maintain the constant resultant force on the test article, and actuate the cables to develop the required cable forces needed to offset the weight of the test article as the test article moves from position to position. The system can also use a plurality of such support assemblies to handle large size test structures.

14 Claims, 7 Drawing Sheets

MICROGRAVITY SUSPENSION SYSTEM FOR SIMULATING A WEIGHTLESS ENVIRONMENT

ORIGIN OF THE INVENTION

The invention described herein was made in the performance of work under Phillips Laboratory Contract Nos. F04611-88-C-0068 and F04611-90-C-0081 with the United States Government. In accordance with 35 U.S.C. 202, the inventors have elected to retain title.

BACKGROUND OF THE INVENTION

1. Field of the Invention

The present invention relates to the general field of suspension and testing of structures and, more specifically, to a microgravity suspension system used to suspend a test article in a ground test laboratory for the purpose of testing it in a simulated weightless environment.

2. Description of the Related Art

The development and deployment of a new generation of precision spacecraft, satellites, antennas and other similar space structures has prompted increased interest in the establishment of ground testing facilities which include versatile suspension systems to support the structures and allow them to behave as if they were in earth's orbit. The testing of such structures is extremely important before deployment in space since the size and weight of some of these structures can present difficulties in control and movement in space. Also, some of the structures are required to maintain their shape and alignment to within microns. Other structures may be smaller and stiffer, and will be required to slew rapidly, achieving pointing accuracies on the order to microradians, and limit jitter to nanoradians.

Therefore, there is a need to test such structures before deployment to enhance the structure's design or to modify a structure to permit it to achieve its desired performance in space. Such testing can also provide useful data regarding a structure's natural frequencies, damping and modes of vibration which can be critical in the design and manufacture of the structure and future structures.

There have been various approaches that have been taken with ground testing of large structures in order to approximate or nearly approximate the microgravity environment of space. Some systems and methods have been more successful than others in simulating a microgravity environment.

One approach that has been used to allow both horizontal and vertical motion of suspended test structures is through the suspension of the structure with long bungee-type cords which support the structure in a pendulum fashion from a high ceiling. While this particular approach provides somewhat useful data acquisition, the length of the cords involved is inversely proportional to the square of the fundamental frequency of the suspended structure, which may require a large overhead clearance to accommodate the long cords, especially if the fundamental frequency of the structure is below one Hertz. Also, the motion of the suspended structure may be limited to a few inches and the bungee cord itself can contribute unwanted mass, damping and stiffness to the structure, possibly distorting its natural properties.

Another approach at simulating a microgravity environment has utilized zero spring rate mechanisms which are theoretically capable of suspending a structure with an arbitrarily small vertical spring rate, unlike bungee cords where the vertical spring rate is inversely proportional to the length. Suspension damping and mass are also lower than those of bungee cords, although large overhead clearance is still required for horizontal isolation which depends on the pendulum effect. Again, the length of the suspension cables used in this suspension system would be inversely proportional to the square of the structure's fundamental frequency. Also, some zero spring rate mechanisms can have a limited range of motion of just a few inches and, although capable of providing a significant improvement over bungee cords, may still contribute unwanted mass, damping and stiffness to the structure during testing, but to a lesser degree than bungee cords.

A solenoid-type support system which uses electromagnetic force to support the test structure has also been designed and tested. Such a system eliminates friction by avoiding mechanical contact of relatively moving parts. A solenoid-type system can eliminate unwanted mass and stiffness by compensating for it with an active (feedback) control system. Still, however, large overhead clearances may be required for horizontal isolation if the solenoid-type suspension system depends upon on the pendulum effect as well. Horizontal motion of the structure can also be limited to a few inches and the system can have a high electrical power requirement. Also, such a suspension can generate a large amount of heat and a strong magnetic field which may cause distortions in electronically acquired test data.

Another suspension/test system utilizes electropneumatic components which employ an air-lubricated pneumatic cylinder to support the weight of the structure. Structures of various weights are suspended by regulating the air pressure behind the piston in the cylinder. Friction is eliminated by avoiding mechanical contact of relatively moving parts. Suspension stiffness and mass can also be compensated for by a small actively controlled solenoid-type device. However, such a system may still rely upon the pendulum effect for horizontal isolation which may require a large overhead clearance. Motion of the test structure may again be limited to a few inches utilizing such an electropneumatic system.

Thus, there are common problems associated with numerous forms of suspension systems which hinder the effective gathering of data relating to the test structure and which require special overhead clearance which is sometimes prohibitive. Also, since many of these known suspension systems may have a relatively limited range of simulated microgravity motion, it is often difficult to perform the dynamic tests desired for realistic ground testing. Also, deployment and operation of certain space structures, such as space robotic arms, are typically flexible and can undergo large motions, characteristics of which bungee cords and other unidirectional suspension systems are not well suited to handle. As a result, there is a need for an improved microgravity suspension system which eliminates some of the disadvantages which have been associated with prior systems. Such a system would be significantly improved if it allowed for a wider range of motion of the test structure and eliminated the requirements for large overhead clearance.

SUMMARY OF THE INVENTION

Briefly, and in general terms, the present invention provides a new and improved microgravity suspension system which can be attached to a test article or structure to simulate a zero gravity or near zero gravity environment by supporting the test article or structure so that a constant vertical force equal to the supported weight of the test article is maintained as the article moves from one position to another upon the application of either external or internal forces. The present invention thus simulates an environment such that the test article is free to move as if it were floating freely in space with no cables attached within a limited range of motion. The present invention eliminates the requirement for large overhead clearance by using three short cables at each attachment point to the structure instead of one long one, allows motion in any direction of several feet or more, and minimizes the effect of suspension stiffness, damping and mass of the supporting cable mechanism.

The present invention is directed to a microgravity suspension system that utilizes at least one support assembly attached to the test article for suspending the article from an overhead support. The support assembly includes three cables, each having a first end attached to the test article with the cables being adapted to cooperatively maintain a constant vertical force on the test article which is equal to the weight of the article. The system includes means operative with each cable for adjusting the force in the cable to continuously maintain the constant force on the test article as the position of the article changes due to the application of forces on the test article which move it for testing purposes.

The present invention can also be employed in a system which utilizes a plurality of support assemblies which are attached at several points to the test structure. As a result, a larger size structure can be supported and tested through the use of multiple support assemblies which are attached at different points and distributed over the entire structure. This plurality of support assemblies includes means for adjusting the force in each cable to continuously maintain a constant vertical force on the test article as it moves beneath the overhead support to which the system is attached. Also, means for controlling the plurality of support assemblies is included to properly maintain and command the support assemblies to the develop the necessary cable tensions needed to offset the weight of the test structure and keep it in proper orientation.

In one form of the present invention, the force adjusting means includes means for determining the position of the test article as it moves from one position to another, means for calculating the force required in each of the cables at each new position to maintain the constant vertical force on the test article, and means for actuating the cable to develop the required force in each of the cables. Each of these means would be operative with one another in order to continuously calculate each new position, the forces necessary to be developed in each cable at each new position, and develop the required force or tension in the cable at each new position.

In another particular form of the invention, the means used to adjust the force in each cable of the support assembly includes an actuator assembly connected to each cable and the overhead support. Each actuator assembly includes a spool-like member or drum attached to the free end of the cable for wrapping a portion of a cable thereabout. Means for supporting the weight of the test article carried by the associated cable is connected to the spool-like member. Means for applying a torque to the spool-like member for varying the force or tension in the cable is also provided. In this particular form of the invention, each actuator also includes means for sensing rotation of the spool-like member as the test article is moved from position to position beneath the overhead support. Control means are also operative with each actuator assembly for computing changes in the position of the test article which can be determined from data relating to the rotational displacement of each of the spool-like members. The control means also computes the amount of torque that must be applied to each spool-like member in response to changes of the position of the test article to maintain the constant vertical force on the test article. The control means also sends out the command to each of the torque applying means to apply the required torque to each of said spool-like members.

In one particular form of the invention, a torsion spring having one end connected to the overhead support and the other end connected to the spool-like member is utilized to support the weight of the test article carried by the associated cable. A torque motor can be attached to the other side of the spool-like member to provide the proper amount of torquing needed to maintain the constant force on the test article as it moves from position to position. Alternatively, another motor can be attached to the end of the torsion spring not connected to the spool-like member, allowing the entire load to be supported by that motor. This particular motor can then rotate the spring allowing the spool-like member to follow the motion of the structure and produce the cable tensions necessary to offset the test article load, without creating lateral forces.

The present invention is directed to a method for suspending a test article to simulate a zero gravity or near zero gravity environment utilizing the principals described above. One particular method has advantageous features since it can eliminate the need for large overhead clearance, allows both vertical and horizontal movement of the test article not limited to a few inches, and minimizes the effect of suspension stiffness, damping and mass.

The features and advantages of the present invention will become more apparent from the foregoing detailed description taken in conjunction with the accompanying drawings which illustrate by way of example, the features of the present invention.

Figure 5:
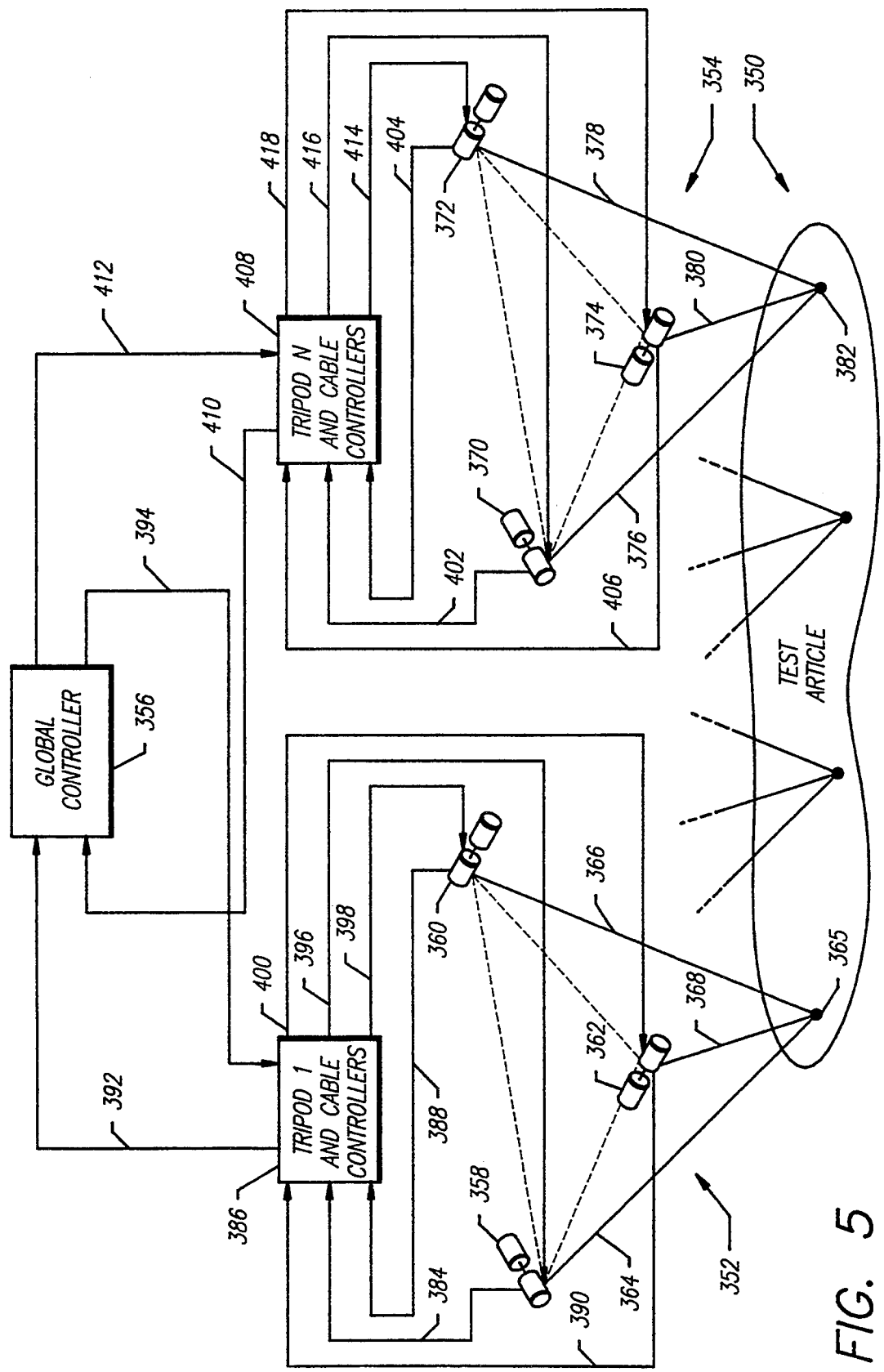
Figures 6, 7:
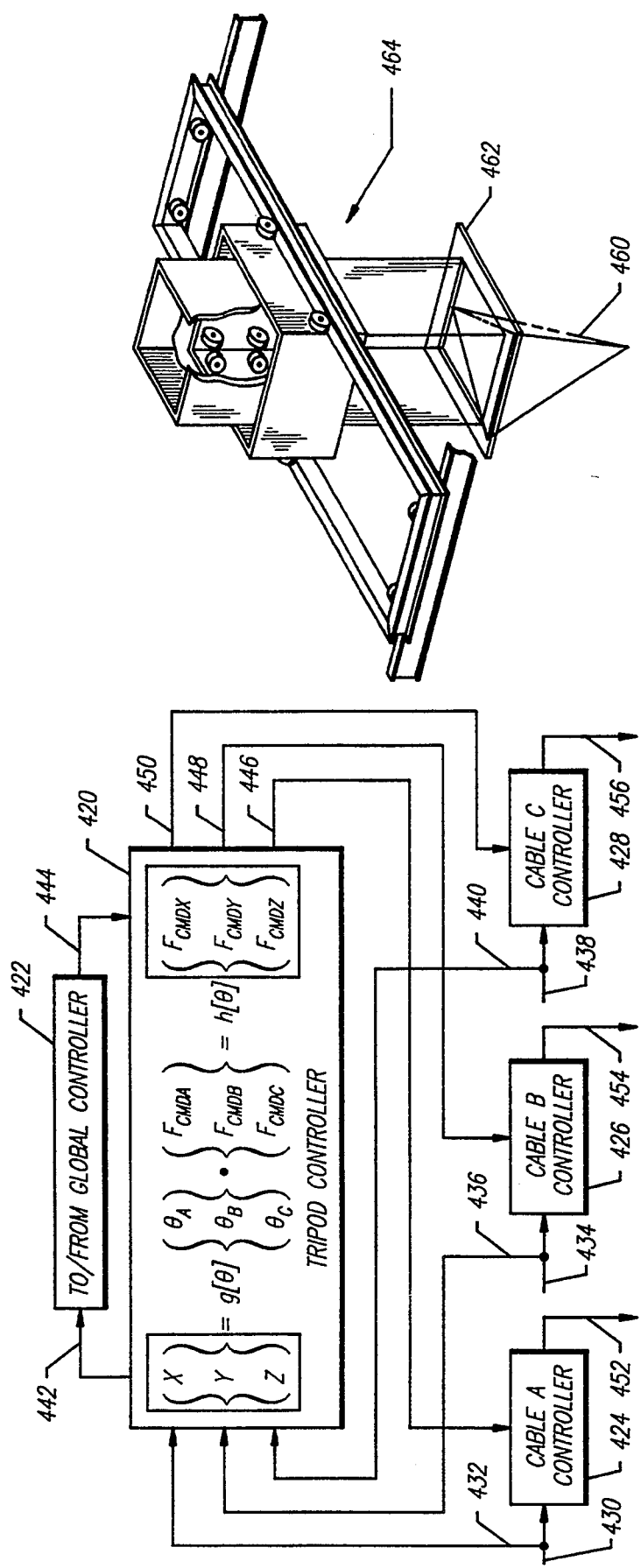
Figure 8:
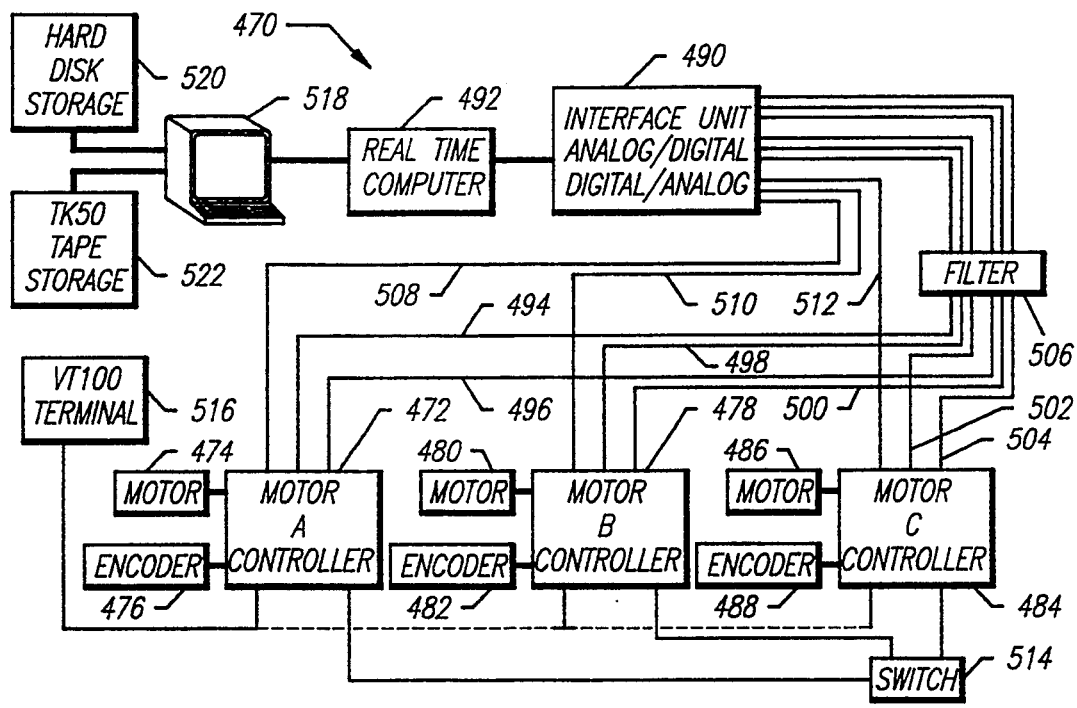
Figure 9:
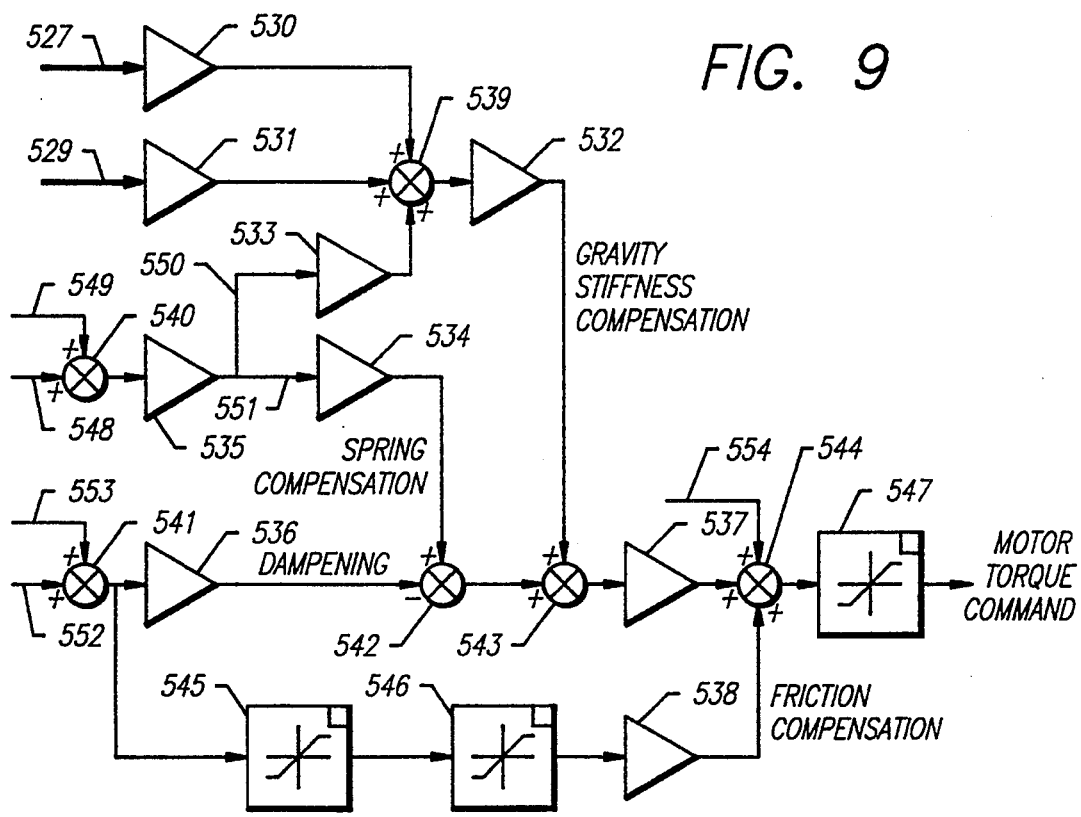

FIG. 5 is a block diagram of a control system with use with a plurality of support assemblies which shows basic concepts of the global control system of the present invention;

FIG. 6 is a block diagram of a tripod controller which is modified for the global control system;

FIG. 7 is a perspective view of a support assembly attached to a three-dimensional carriage for dynamic repositioning of the test article;

FIG. 8 is a block diagram of a control system that can be implemented in conjunction with an embodiment of the present invention; and FIG. 9 is a schematic diagram of a control algorithm of the type that can be implemented with the control means of each tripod support assembly for suspension stiffness, damping and gravity compensation.

DETAILED DESCRIPTION OF THE PREFERRED EMBODIMENTS

Figure 1:
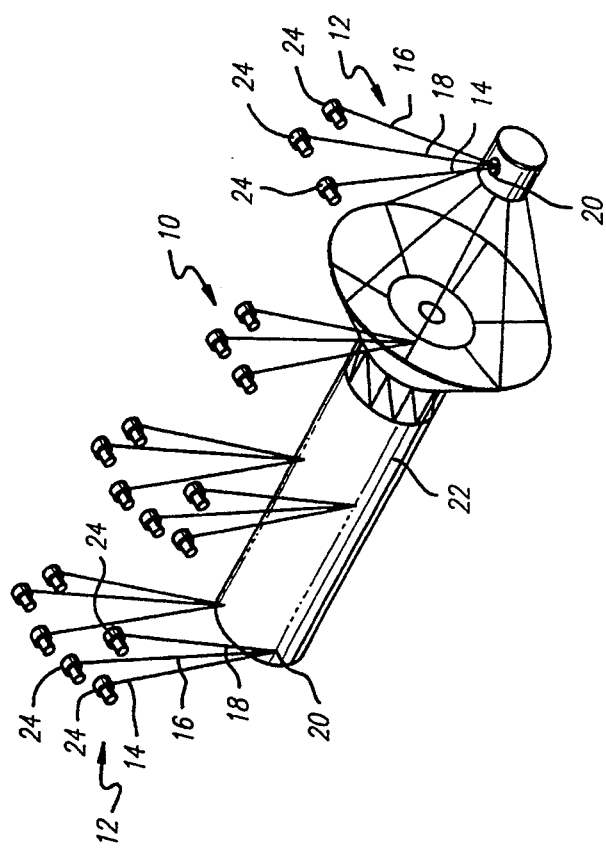
FIG. 1 is a perspective schematic view of one form of a suspension system utilizing a plurality of support assemblies made in accordance with the present invention.

Referring now to FIG. 1 of the drawings, there is shown one particular embodiment of a microgravity suspension system embodying features of the present invention. The suspension system 10 shown in FIG. 1 utilizes a plurality of support assemblies 12, each of which includes three cables 14, 16 and 18 each having an end that is attached to a common point 20 (also referred to as the attachment point) on a test structure 22, such as a satellite or similar space structure. The system 10 shown in FIG. 1 is a distributed suspension system since it is designed to suspend a structure at a number of attachment points which are distributed over the entire structure.

Each support assembly 12 is attached to an overhead support (not shown in FIG. 1) to allow the test structure to move either horizontally or vertically in three dimensional space. Each cable of the support assembly is operatively connected with an actuator assembly 24, the component that is actually mounted to the overhead support, which is capable of performing various functions which will be described in detail below. The actuator assemblies are capable of suspending the test structure to maintain a constant vertical force at the attachment point 20 which is equal to, and offsets, the weight of the structure (referred to herein as the resultant vertical force). There are means associated with the actuator assembly which maintain the required force or tension in the associated cable to maintain the resultant vertical force even as a structure moves from one position to another under the application of either internal or external forces.

The three cables of each support assembly are suspended from an overhead support in an inverted tripod-like arrangement. Each cable connects substantially to the same location on the structure, i.e., the attachment point 20, while the actuator assemblies are spaced apart in a triangular arrangement to form the "base" of the inverted tripod. The nominal design of the support assembly, also referred to herein as the tripod assembly or tripod support assembly, is such that the base is an equilateral triangle lying in a horizontal plane so that the lengths of each cable, at an initial rest position, will be substantially the same. In general, however, the base of the "tripod" may be any triangle, not necessarily horizontally arranged, and the length of each cable can be different when the test structure is at an initial rest position. This latter described arrangement may be required at times to accommodate various configurations of the test structure and to avoid interference between cables of adjacent tripod assemblies.

It should be appreciated that the length of the cable or "leg" of the tripod will either increase or decrease depending upon the position of the attachment point as the test structure is moved by an external force. Therefore, as the test structure moves from one position to another, force or tension applied by each cable will change, along with the length of the cable and the angle that the cable makes with the vertical in response to the new position. In such a manner, each cable of the tripod support assembly cooperates with the others to maintain the appropriate amount of tension or force to offset the weight of the test structure.

Each tripod support assembly includes means for controlling or commanding each actuator assembly within the given tripod assembly so as to achieve the correct application of cable forces necessary to offset the weight of the test structure. Basically, the control means, described in greater detail below, are capable of computing the new position of the attachment point correspondingly with the test structure as it moves from position to position. This control means determines or computes the forces that must be applied in each of the cables, in response to the new position of the test structure, to maintain the resultant vertical force on the structure. Also, the control means commands the actuator assemblies to attain the necessary force or tension within each of the support cables. Depending upon the type of actuating system utilized, the control means can perform this function in a number of ways, dependent of course, on the particular elements and structure used to create the actuator assembly.

The control used for each actuator assembly can also be implemented to compensate for suspension mass, damping and stiffness to generate more accurate commands and to better control the function of the actuator assembly in developing the necessary force in the cable to offset the weight of the test structure.

The system shown in FIG. 1 also includes control means (not shown), sometimes referred to herein as global control, which controls and coordinates a number of support assemblies to achieve the proper resultant forces to offset the weight of the test structure. This global control basically commands the resultant forces to all the tripod assemblies so as to balance the external suspension forces acting on the test structure. The global control is shown in schematic form in FIG. 5 and will be described in greater detail below.

It should be appreciated that the present invention can utilize a single tripod support assembly to support a test article, or structure, to simulate a zero gravity or near zero gravity environment for testing purposes. The number of tripod support assemblies that can be utilized in any one system can vary depending upon such parameters, for example, as the size, length, weight, and strength of the test structure along with the rated capacity that the particular assembly can properly carry. The range of motion achievable by the present invention can also vary and can be increased, for example, by enlarging the base of the tripod and increasing the length of each cable used with the tripod assembly. Other methods for increasing the suspension capabilities of a system for extremely large structures or ranges of motion are further discussed below.

Figure 2:
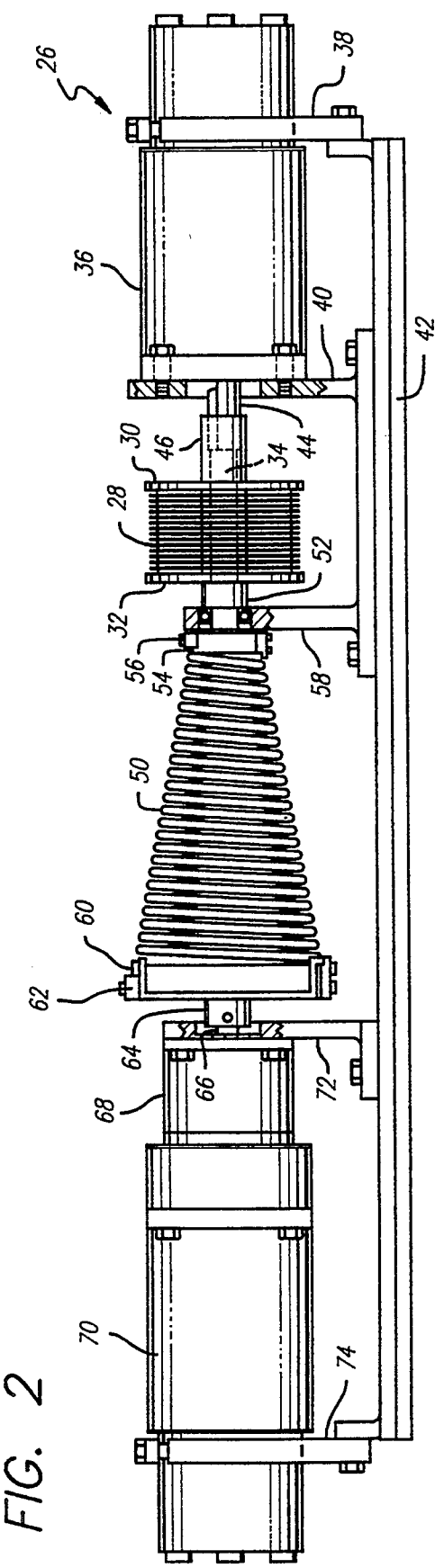
FIG. 2 is a side elevational view of one form of a composite actuator assembly that can be used to control the cables used in accordance with the present invention.

Referring now to FIG. 2, one particular form of a composite actuator assembly 26 made in accordance with the present invention includes several means for actuating a cable in a tripod support assembly. This composite actuator assembly 26 includes a spool 28 or spool-like member, which can also be a drum or similar member upon which a portion of the cable can be wound to allow the cable to move in response to changes in the position of the test structure. The spool 28 has a first end 30 and a second end 32 along with a shaft 34 or pin which extends through the center of the spool to allow it to be rotatably mounted. A torque motor 36 is connected with the shaft 34 of the spool along the first end 30 of the spool. This torque motor 36 is mounted on brackets 38 and 40 which are mounted in turn to a baseplate 42. The motor 36 includes a shaft 44 which is attached to the shaft of the spool via coupling device 46 or similar fastening assembly. Bolts 48 or similar fasteners keep the motor properly mounted on its brackets.

A torsion spring 50 is attached to the other end 32 of the spool via a coupling device 52. The end 54 of the spring is mounted in a spring retainer 56 which is connected with the shaft 34 of the spool. A bracket 58 supports the components and is in turn mounted to the baseplate 42. The other end 60 of the torsion spring 50 is also mounted to a spring retainer 62 with a coupling 64 which is connected to the shaft 66 of a gear box 68. This gear box is operatively connected with a position-controlled (stepper) motor 70. This motor 70 and gear box 68 are mounted on a pair of brackets 72 and 74 which are mounted to the base plate 42.

This composite actuator assembly 26 allows a number of combinations to be used to control and develop the appropriate amount of cable tension or force necessary to maintain the resultant vertical force on the test structure. For example, it is possible to use the torque motor 36 alone in parallel with the torsion spring to develop what can be referred to as a parallel motor arrangement by simply fixing the end 60 to the ground (the base plate) to prevent the end from moving. In this arrangement, the torsion spring 50 is designed to support the weight carried by the cable when the article is at a rest position. The torque motor would then be capable of applying torques to the spool to develop the desired cable forces necessary to maintain the resultant vertical force. Means for sensing displacement of the spool, such as an angle encoder device, which provides one method for determining the new position of the test structure, would be operatively connected with the torque motor, along with a controller to assure that the motor develops the proper amount of torque needed to be applied to the spool. These particular control, measuring and sensing devices, along with the particular functional features will be described further below.

A second arrangement of components can also be implemented by simply disengaging the torque motor 36 to allow only the position-controlled motor 70 with its gear box 68 to be connected in series with the torsion spring 50. This arrangement of motor and gear box (the motor/gear unit), sometimes referred to herein as a series motor or a geared position controlled motor, can achieve larger motion capabilities. In this arrangement, the entire load on the cable is "supported" by the motor; however, the peak torque required is reduced by the gears of the gear box. Small amplitude, high frequency motion of the test article causes the spring to deflect. The motor/gear unit responds only to the lower frequency components of the test article motion. Thus, the motor/gear unit slowly "unwinds" the spring to track large amplitude low frequency motion, thereby avoiding excessive stress in the spring. In operation, the motor/gear unit positions the end of the torsion spring so as to create spring torque on the spool which produces the cable tension necessary to offset the test article load, generally without creating lateral forces. This particular arrangement is generally more applicable when testing articles having low frequency vibration because the band width of the motor/gear unit is somewhat limited.

Another arrangement of components which utilizes both the torque motor and gear position controlled motor results in an actuator assembly which combines the advantages of the first two arrangements described above. In this particular arrangement, the composite actuator assembly operates with both motors operational allowing the parallel torque motor to compensate for spring stiffness and suspension damping, and to adjust cable tension to produce the correct force on the test article to offset gravity in response to test article motion. The geared position controlled motor operates to track only low frequency motion of the spool, ostensibly unwinding the spring to limit stress, or winding it up to maintain tension in the cable.

One other basic arrangement would require the use of a single torque motor 36 as a means of applying control torques to the spool. In this arrangement, the torsion spring would not be connected to the spool, and accordingly, the motor would be required to apply all the torque necessary to support the weight carried by the support cable, even at a rest position. This one form of an actuator assembly that can be made in accordance with the present invention, namely the single torque motor and spool arrangement, along with the control system utilized with each of the three actuator assemblies in a single tripod support assembly will herein be described first.

Figure 3:
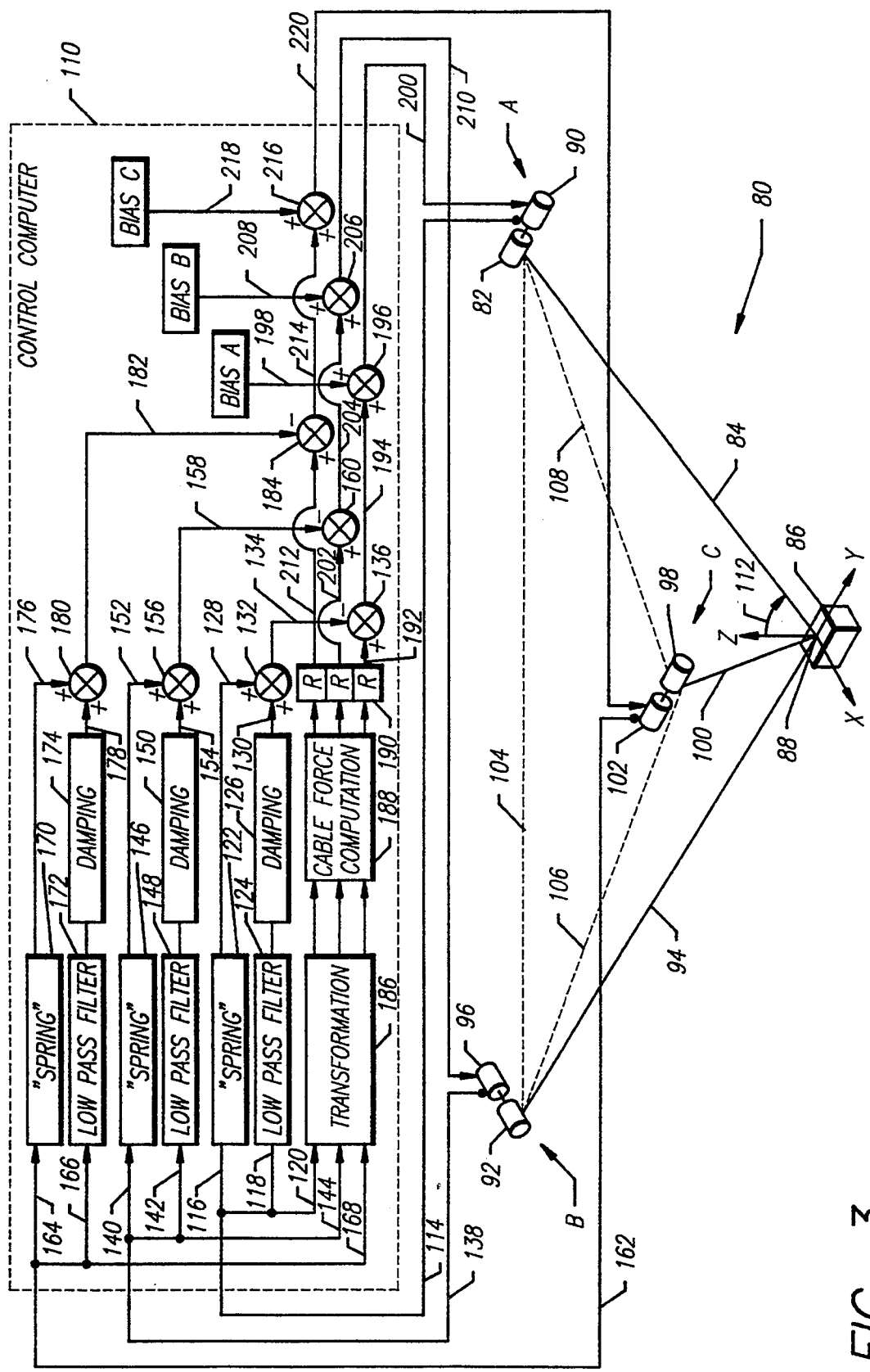
FIG. 3 is a block diagram of a control system for use with a single support assembly which shows the basic concepts of the supporting method and apparatus of the present invention.

Referring now to FIG. 3, one particular form of a tripod support assembly 80 which uses a single motor as the means of applying control torques to each spool is shown. The tripod support assembly 80 includes three actuator assemblies, designated as actuator assembly A, actuator assembly B and actuator assembly C. Actuator assembly A includes a drum 82 upon which is wound a control cable 84. This control cable 84 is in turn attached to a test article 86 at the attachment point 88. This test article is shown simply as a block although another suitably sized test article or structure could be attached to this particular tripod support assembly. Arrows X, Y and Z denote the particular coordinate system or frame of reference with respect to which the test article moves during testing. A torque motor 90 is in turn attached to the spool 82 to apply the control torque necessary to maintain the proper tension in cable 84 necessary to help offset the weight of the block.

Similarly, actuator assembly B also includes a spool 92 upon which a control cable 94 is wound. This control cable 94 is in turn attached at the attachment point 88 on the block and a torque motor 96 is used to apply the control torque to spool 92. Actuator assembly C also includes a drum 98 upon which a control cable 100 is wound. This control cable 100 is attached to the block and a torque motor 102 is connected directly to the spool 98 for applying the control torque to the spool.

Dashed lines 104, 106 and 108 show the particular "base" of the tripod arrangement in which each actuator assembly lies in a horizontal plane with the base being substantially an equilateral triangle as defined by the dashed lines 104, 106 and 108. By using this particular arrangement of components, the test article can start at its rest, centered position, such that each of the control cables 84, 94 and 100 are substantially the same length when the test article is at the initial rest position. As the article moves towards one of the actuator assemblies, the lengths of the control cables either increase or decrease as needed and the tension in the particular cables either increases or decreases depending upon the new position of the test article. The torque motors for each of the actuator assemblies are controlled by a control computer which is contained within the dashed line 110 shown in FIG. 3. A more complete description of this control computer along with the particular commands and computations it makes and sends to the respective actuator assemblies will be described herein below.

In operation, as the test article moves from the initial rest position to a new position, the length of each control cable changes. The change in length for each cable is determined by measuring the rotation of its respective spool. By measuring the change in the three cable lengths as the test article moves from position to position, it is possible to calculate the new position of the test article and compute the three cable forces needed to offset the weight of the test article. It is then possible to command the particular torque motors to create the control torque necessary on the spools to develop the required cable tensions.

The control means which make it possible to "instantaneously" (i.e., in real time) calculate the cable tension at each new position and control the torque motors to develop the cable forces in the control cables is shown as the control computer found within the dashed line 110. Each actuator assembly A, B and C provides input to the control computer and receives torque commands to control the amount of torque being applied to the spool. It should be noted that each of the actuator assemblies A, B and C also has an angle encoder or transducer operatively associated with each of the torque motors to provide a signal to the control computer which is utilized in the position and force calculations. It is also possible to select a torque motor which has built-in sensors and electronics to sense shaft angular displacement and velocity with sufficient accuracy to provide the necessary signal to be generated to the control computer.

The control computer is capable of performing several calculations with the signals it receives from the actuator assemblies to generate commands that are in turn sent to each actuator assembly. One calculation involves the determination of the new position of the test article. This calculation requires a transformation of the changes in cable lengths to a change of position in the X Y Z coordinate system. The resulting data obtained in the position calculation are then utilized for the computation of each new cable force required to offset the weight of the test article at the new position. The signal which is generated from the cable force computation takes into account the radius of the spool in generating a torque command to each of the torque motors.

The motion of each spool of this particular motor/spool arrangement is resisted by small forces proportional to position and a low frequency component of velocity, to produce, respectively, soft electric "springs" and a small amount of low frequency damping, thus creating a low frequency suspension mode to keep the test article centered. These functions are designated by the boxes labeled "spring," low pass filter, and damping in the schematic diagram of the control computer shown in FIG. 3.

Referring first to actuator assembly A, line 114 sends the input signal from the angle encoder, measured in terms of the angular displacement of the spool, as the length of the cable either increases or decreases. The signal that travels via line 114 produces an enabling input signal into lines 116, 118 and 120 as well. Line 120 is sent for computation of the gravity compensation which uses the newly computed position of the test article to compute the cable force needed in each cable and produce a torque command to develop the proper cable tension. Line 116 sends the displacement signal for the calculation of spring stiffness compensation 122. Line 118 sends the velocity signal through a low pass filter 124 for the calculation of low frequency damping compensation. Lines 128 and 130 carry the respective output signals generated from the spring compensation and damping compensation. They are summed together at an adder 132 which sends the resulting summation over line 134 to a second adder 136. There the spring and damping compensations signal is subtracted from the torque command generated from the gravity compensation computation to generate the torque command.

Likewise, actuator B has an input line 138 which also provides an enabling input through lines 140, 142 and 144. The input signal in line 140 is sent to the spring compensation calculation 146, while the input in line 142 passes through the low pass filter 148 and in turn to the damping compensation calculation 150. The output signal from spring compensation 146 is sent via line 152, and output from damping compensation 150 is sent via line 154 and to adder 156. The resulting signal is sent in turn via line 158 to be subtracted from the gravity compensation torque command at adder 160.

Actuator C sends its input via line 162 where it produces an enabling signal via lines 164, 166 and 168. Line 164 sends the input to a similar spring compensation calculation 170. The input signal which is sent via line 166 passes through a low pass filter 172 and is processed in the damping calculation 174 which adds low frequency damping to actuator C. The output from the spring calculation is sent via line 176 and the output from the damping calculation via 178 to an adder 180. The summed up signal is then sent via line 182 to an adder 184 which subtracts the signal from the gravity compensation torque signal that is also sent to adder 184.

The input signal which travels via lines 120, 144 and 168 are processed in the displacement transformation calculation 186 which as mentioned above, processes the input signals from each actuator assembly to compute the test article's new position. Once the new position is calculated, input is then sent to the cable force computation 188 which uses the calculated position to compute the three cable forces needed to offset the weight of the test article at its new position. The resulting computation takes into account the particular spool radiuses by multiplying the forces by the radiuses to create the particular torque commands which are then sent to the respective actuator assemblies. As can be seen in FIG. 3, line 192 delivers the output signal to the adder 136 which subtracts the signal generated by the spring and damping compensation calculations. The resulting signal is then sent via line 194 to another adder 196 which adds a bias via line 198 to the final command.

This final command is then sent via line 200 to the torque motor. This output signal thus commands the torque motor 90 to apply the necessary control torque to the spool 82 to achieve the necessary force in cable 84.

The torque command for Actuator B sent via line 202 has the signal for the spring and damping compensation subtracted at adder 160 to produce an output that is sent via line 204 to another adder 206. This adder which adds a bias which is sent via line 208 to form a composite torque command that is sent to torque motor 96 via line 210. As with actuator A, this torque command controls the torque motor 96 to torque the spool 92 to develop the correct tension in cable 94.

Likewise, the torque command for actuator C is sent via line 212 into the adder 184 which subtracts the signal being sent via line 182. The composite output signal is then sent via line 214 to another adder 216 which adds bias which is applied to the torque motor 102 and is sent via line 218. The resulting torque command is thus sent via line 220 to the torque motor 102 of actuator assembly C. In this manner, the spool 98 is properly torqued to achieve the tension necessary in control cable 100.

The bias commands which are sent via lines 198, 208 and 218 to each motor of actuator assemblies A, B and C basically produce the cable forces needed to support the test article at its rest position. Without such biasing, the torque motor would be unable to support the weight of the test article.

This particular tripod support assembly shown in FIG. 3 utilizes a minimum amount of hardware and control means to perform the desired functions of the present invention. This particular embodiment permits large displacement motion of the test article and requires fewer mechanical components and motors than the other approaches that have been discussed. However, a larger motor is required compared with other approaches which support the at rest load on mechanical springs. Also, this approach is possibly more sensitive to noise in the torque command signal and it could present some safety problems since the test article could be dropped if power is shut off to one or more of the torque motors of the actuator assemblies.

The actuator assembly that utilizes both a torsion spring and a torque motor applied to the spool would use the same control computer shown in FIG. 3 with some minor changes. In such an arrangement, since the torsion spring supports the weight exerted by the cable, the bias commands would be eliminated and the possibility that the test article could fall if power is shut off to any of the actuators would be eliminated. Also, the sign and magnitude of the position gains would be changed to create torques that partially, or completely, compensate for the stiffness of the mechanical spring.

Figure 4A:
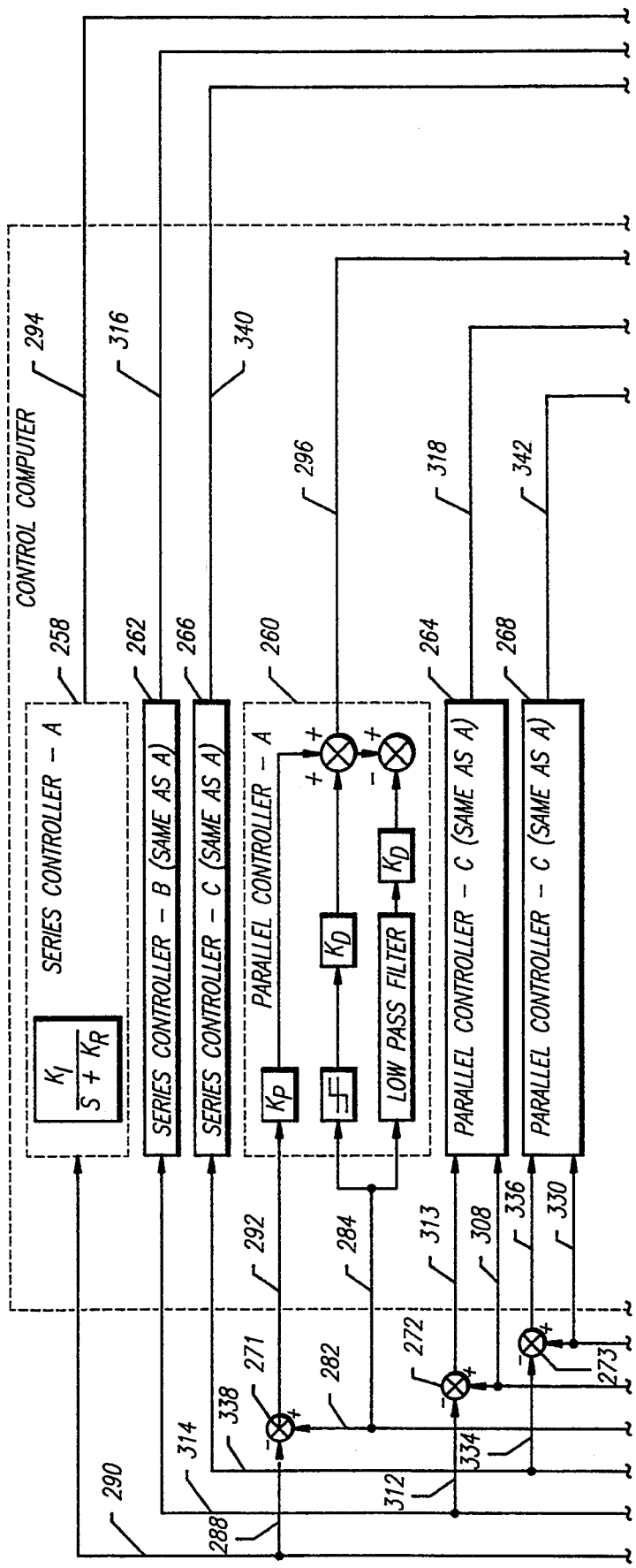
FIG. 4 is a block diagram of a control system suitable for use with a support assembly utilizing a composite actuator assembly such as the one shown in FIG. 2 which again shows the basic concepts of the supporting method and apparatus of the present invention.
Figure 4B:
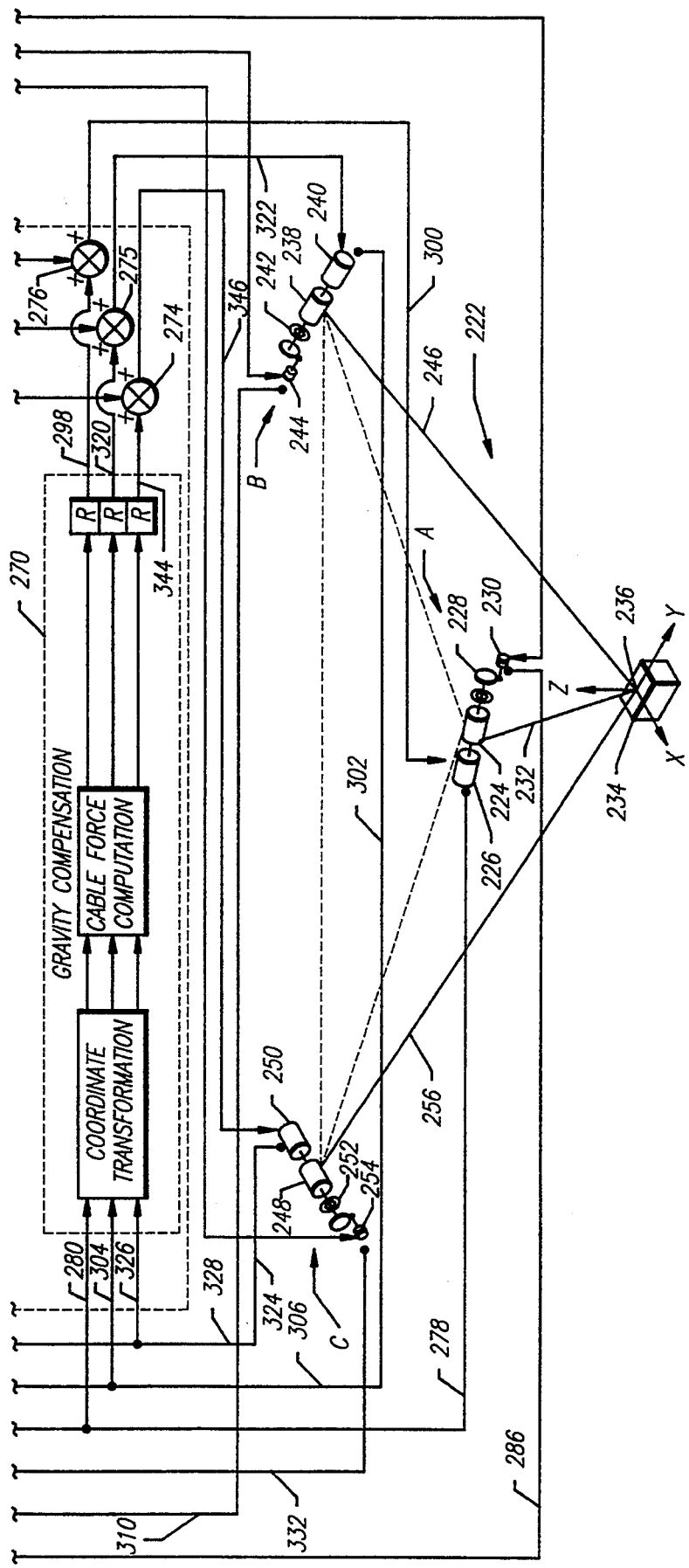

Referring now to FIG. 4, another tripod support assembly 22 is shown which utilizes three actuator assemblies, designated as actuator assembly A, B and C. Each of actuators A, B and C utilize the same components for control of the cables of the assembly. Actuator assembly A includes a drum 224 which is connected in parallel to a torque motor 226. The other side of the spool is connected to a torsion spring 228 which is in turn connected to a geared position-controlled motor 230 acting in series with the spring. These particular components control cable 232 which is attached to the test object 234 at the attachment point 236.

Similarly, actuator B includes a spool 238, a torsion motor 240, torsion spring 242 and geared position-controlled motor 244 to actuate control cable 246. Actuator assembly C also includes a spool 248, a torque motor 250, a torsion spring 252 and a position-controlled motor 254 to actuate the control cable 256.

In this particular arrangement of components, a signal is sent from both the torque motor and geared position-controlled motor which also receive a torque command and a position command, respectively, from the control computer. The control computer shown in FIG. 4 includes a series controller 258 and parallel controller 260 for actuator assembly A. Likewise, a series controller 262 and parallel controller 264 is utilized with actuator assembly B. Series controller 266 and parallel controller 268 are also provided for actuator assembly C. The series controllers 258, 262 and 266 are the same as are the parallel controllers 260, 264 and 268. The control computer also includes means for computing the gravity compensation 270 which is similar to the gravity compensation calculations shown in FIG. 3 and described above. The computer also includes a plurality of adders 271–276 which are utilized in the input and output signaling of the system.

Referring initially to actuator assembly A, a line 278 sends out an input signal to the control computer which constitutes the angular displacement of the torque motor and spool. Also, the angular velocity of the spool is additionally input to the computer via line 278. Line 278 also sends the input signal of the angular displacement of the motor and spool in actuator assembly A to the gravity compensation 270 via line 280 and to the parallel controller 260 via line 282. The velocity signal from the torque motor is also sent into the parallel controller via line 284.

An input signal is also generated from the geared position control motor in actuator assembly A which is sent over line 286 to both the parallel controller 260 and series controller 258. This particular signal is the angular displacement of the end of the spring which is attached to the series motor. This input is in turn is sent over line 288 and 290 to be input to the parallel controller and series controller respectively. The input that is sent over line 288 is subtracted from the input being sent from line 282 at the adder 271 to generate an input that is sent over line 292 which is basically the relative angular displacement across the spring.

The output commands generated from the series controller 258 is sent over line 294 to the geared position-controlled motor in assembly A. Likewise, the dynamic compensation command which is output from the parallel controller 260 is sent via line 296 to be added to the command being generated from the gravity compensation calculations over line 298. These commands are added together at the adder 276 and a composite torque command is sent via line 300 to the torque motor 226 of assembly A.

The other two actuator assemblies B and C input their signals and receive torque commands in the same manner as described for actuator assembly A. Referring now to actuator assembly B, an input signal is sent from the torque motor 240 over line 302 which corresponds to the angular displacement of this particular motor and spool 238. Also, the signal includes the angular velocity of spool 238 which is utilized in the calculations being sent to the parallel controller 264. The signal which is sent over line 302 is provided for the gravity compensation calculations via line 304 and to the parallel controller via line 306. The angular velocity of the spool 238 is in turn sent to the parallel controller via line 308. The input signal that is sent to the computer from the series motor 244 is sent via line 310 which sends the signal, the angular displacement of the series motor end of the spring, to the parallel controller 264 via line 312. This particular input is subtracted from the signal being sent via line 306 by the adder 272. The resulting summation, which is basically the angular displacement of the spool 238 subtracting the angle of displacement of the series end of spring 242 is inputted via line 313 into the parallel controller 264. The input from the series motor is also sent via line 314 to the series controller 262. The output from the series controller 262, the command to the geared position controlled motor, is sent directly to that motor over line 316. The dynamic compensation command which is outputted from the parallel controller is sent over line 318 and is summed up with the gravity compensation command which is outputted over line 320. The two output commands are summed together by the adder 275 and the composite torque command to the torque motor 240 is sent over line 322.

Referring now to actuator assembly C, the signal which comprises the angular displacement of the torque motor 250 and spool 248, along with the angular velocity of the spool is sent to the computer via line 324. The angular displacement signal is sent to the gravity compensation via line 326 and to the parallel controller 268 via line 328. The angular velocity component signal is sent to the controller via line 330. The signal from the geared position control motor 254 is sent to the series controller 266 and parallel controller 268 via line 332. This signal is sent via line 334 to an adder 273 which is subtracted from the signal being sent over line 328. The resulting signal is sent over line 336 into the parallel controller 268. The signal from the series motor likewise is inputted to the series controller 266 over line 338. The command which is generated by the series controller 266 is sent to the geared position control motor 254 over line 340. The dynamic compensation command which is generated by the parallel controller 268 is outputted via line 342 and is added to the torque command generated by the gravity compensation and sent over line 344. The two output signals are added by the adder 274 and the composite command signal is sent to the motor 250 over line 346.

Referring now to FIG. 5, a composite suspension system is shown in a schematic diagram form and includes two tripod support assemblies, referred to as tripod 1 and tripod N, and including means for controlling multiple tripod support assemblies designated as the global controller 356. It should be appreciated that in FIG. 5, only two tripod support assemblies are shown and connected with the global controller although it is possible to utilize multiple tripod support assemblies which would in turn also be operatively connected to the global controller.

The tripod support assembly 1 includes three actuator assemblies, 358, 360 and 362 which actuates control cables 364, 366 and 368. These control cables are attached to a test article at attachment point 365 which has substantial length which requires the use of additional tripod assemblies to properly support and maintain the test article in the proper position to offset the weight of the article. Likewise, tripod N includes three actuator assemblies 370, 372 and 374 which control cables 376, 378 and 380. These cables are attached to the test article at attachment point 382 which is the reference point from which this particular tripod responds to in accordance with the control commands received during operation of the system. The two tripod support assemblies 381 and 383 show how additional assemblies could also be attached to the structure.

Referring back to tripod 1, a signal is sent from actuator 358 over line 384 into the controller 386. Likewise, a signal is inputted from the actuator 360 over line 388 into the controller 386. A third input signal from actuator 362 is in turn sent via line 390 to the controller as well. The signals received in the cable controller 386 are in turn sent to the global controller 356 over line 392 with a signal being sent from the global controller over line 394 back to the controller of tripod 1. This signal is then utilized to generate the torque commands which are sent over lines 396, 398 and 400 to the three actuator assemblies.

In like fashion, the signals from the three actuators of the tripod support assembly N are sent via lines 402, 404 and 406 into the cable controller 408. An input signal is then sent to the global controller 356 from the controller over line 410 for processing. The commands which are calculated by the global controller are in turn sent over line 412 back to the cable controller 408 to allow the required torque commands to be sent to the respective actuator assemblies over lines 414, 416 and 418. In this manner, the global controller provides the torque commands which will be utilized in controlling the particular actuators in both tripod 1 and tripod N.

Referring now to FIG. 6, a schematic which shows a tripod controller 420 which receives a command from the global controller 422. The tripod controller is connected with the cable A controller 424, cable B controller 426 and cable C controller 428. An input signal from the motor from the actuator is sent over line 430 into cable A controller 424. The resulting signal is also sent to the tripod controller which provides the transformation of the position of the attachment point to compute the new position of the test article as it moves. Similarly for the other controllers, input is sent via line 434 into the cable B controller and is directed over line 436 to the tripod controller 420. The input signal to controller 428 is sent via line 438 and 440 to the tripod controller. The tripod controller 420 then sends the signal over lines 442 to the global controller which computes the force commands in global coordinates and transforms those commands back to the tripod controller over line 444. The tripod controller then transforms those commands from the global controller to cable force commands which are then sent over lines 446, 448 and 450 to the three cable controllers. Cable A controller than sends out its torque command to the torque motor over line 452 while cable B and C controllers send their signals over lines 454 and 456.

The dynamic global control concept uses the global controller to command multiple tripod assemblies as is shown in FIGS. 5 and 6. Each tripod controller is modified as is shown in FIG. 6 to explicitly compute displacement of the cable/test article attachment point in global coordinants (X,Y,Z) from cable spool angles, (Phi A, Phi B, Phi C), output those displacements to the global controller, accept dynamic three-dimensional force commands in global coordinates (FCMDX, FCMDY, FCMDZ) from the global controller, and transform those commands to cable force for execution by the cable controllers.

The global controller receives cable/test article displacement measurements from all tripod suspension assemblies, and computes force commands which are transmitted to each tripod controller. In the simplest form, the global control commands a number of suspension assemblies by computing F=kx where F is a vector of force commands, x is a vector of cable/test article displacements and k is a matrix of constants which produce dynamic commands to cancel the geometric stiffness matrix acting on the test article.

The tripod controller must transform the cable spool angles from each of the tripod assemblies in order to correctly calculate the new position of the test structure as it moves from position to position. In this particular form of the invention, the coordinate transformation is calculated for each new position of the attachment points of the cables of the tripod assemblies. With this information, the global controller can then determine the force commands in global coordinates, for processing by the tripod controllers. The tripod controller 420, shown in FIG. 6, computes the forces in each of the three cables required to achieve the force commanded by the global controller. The cable force commands are in turn sent to the respective cable controllers which act to control the tension in each cable.

In the global control system shown in FIGS. 5 and 6, most of the computational load is placed on the processor used for the global controller. The global controller handles the force calculations for all of the tripod support assemblies, while each of the tripod assemblies operate on a much smaller set of data. The basic sequence of events in a computational cycle at each tripod support assembly can be described as follows: 1) read sensors, i.e., the signals from the actuators which determine the displacement of the test structures; 2) perform coordinate transformations from local spool angles to global coordinates; 3) transfer modified sensor data to global controller; 4) receive force commands from global controllers; 5) perform coordinate transformations of force commands from global to local coordinates; 6) compute torque motor commands and spring angle commands; 7) adjust motors. The sequence of events in the computational cycle at the global controller can be described as: 1) receive sensor data from each tripod; 2) compute force commands; 3) transfer force commands to each tripod. Each tripod processor basically performs coordinate transformations for a third order system, while the global processor is performing a F=kx type calculation for a 3N order system where N is the number of tripods in the system.

Referring now to FIG. 7, a variation of the basic cable/tripod concept is obtained by moving tripod support assemblies during a test period. The easiest way to apply this approach is by running a test in segments, keeping tripods fixed during a test segment and repositioning them at the conclusion of each segment. Three positional tripod support assemblies retain the advantages of the baseline cable-tripod approach, mainly, reduced overhead space and elimination of low frequency gravity disturbances.

A logical extension of a repositional tripod concept is to attach the tripod support assembly to a two or three dimensional carriage for dynamic repositioning. Each carriage would be controlled to follow the low frequency motion of the test article. This could be accomplished by passing signals proportional to the displacement of a cable/test article attachment point relative to the base triangle through a low pass filter and then using that signal to drive a carriage to null out relative displacement. This particular tripod concept is better suited for attachment to an overhead carriage than a unidirectional support because its three dimensional control tends to fully compensate for carriage-induced disturbances.

In FIG. 7, a schematic representation of a tripod assembly 460 is shown, as it would be attached to a base plate 462 of a three dimensional carriage 464. This particular three dimensional carriage 464 allows the tripod support assembly 460 to move up or down, forward and backward, and from one side to another by using rollers and rails which are capable of moving the assembly in three dimensions.

FIG. 8 shows a schematic of one possible control system that can be implemented with a single tripod assembly. The system 470 shown in FIG. 8, includes motor A controller 472 which is connected with a motor 474 and encoder 476. A motor B controller 478 is included along with motor 480 and an encoder 482. Motor C controller 484 is connected with a similar motor 486 and encoder 488.

Each of the motor controllers 472, 478 and 484 send an analog position and velocity input into an interface unit 490 which is in turn connected to a real time computer 492. Motor A controller sends its analog position and velocity inputs via lines 494 and 496. Motor B controller sends its analog position and velocity inputs via lines 498 and 500. Motor C controller sends out its signals via lines 502 and 504. The angle encoder signals which are sent by the controllers 472, 478 and 484 are passed through a filter 506, such as an analog Butterworth filter, before being used to compute control commands or store digitally. The signals are then sent to the interface unit 490 to be converted digitally for processing by the real time computer 492. The analog torque command outputs can be sent via line 508 to the motor A controller, line 510 to motor B controller and 512 to motor C controller. Each of the three motor controllers can be in turn connected with a motor safety inhibit switch 514 for manual shutdown. Also, the motor controllers can be serially connected with a VT-100 terminal 516 for manual operation. A VAX work station 518 can also be operatively connected to the real time computer to create a user interface, and could include hard disk storage 520 and TX50 tape storage 522.

Referring now to FIG. 9, one particular form of a control algorithm which can be implemented with the electronic configuration shown in FIG. 8 includes a plurality of control gains 530–538. A plurality of adders 539–544 is also included.

This particular algorithm shows the software that can be implemented to create the parallel motor torque command for one of the actuator assemblies. Initially, the angular position signal from spool A is sent via line 548 into adder 540 where a bias is added via line 549 to account for the static (at rest) position offset of spool A. This signal is in turn directed to gain 535 which converts voltage to the physical units of displacement which represent the change in cable length. The displacement signal is sent via line 550 to gain 533. Similarly, displacement signals from spools B and C are sent to gains 530 and 531 via lines 527 and 529 respectively. Gains 533, 530 and 531 and adder 539 transform the changes in the three cable lengths to cables tension controlled by motor A. Gain 532 converts the change in cable tension to motor torque. This torque represents the contribution of gravity stiffness compensation to the torque commanded to motor A.

Meanwhile, the displacement signal output from gain 535 is also directed through line 551 to gain 534 to create a torque command signal which compensates for the stiffness of the rotational spring. The angular velocity signal is sent to adder 541 through line 552. A velocity offset is sent to adder 541 via line 553. A damping compensation torque is generated by taking the velocity signal output from adder 541 and sending it through gain 536 to generate the small damping compensation torque.

The spring compensation, damping compensation and gravity stiffness compensation torques are then added in adders 542 and 543 to produce a combined torque command which is sent to gain 537 for scaling.

Meanwhile, the velocity signal output from adder 541 is also sent through a deadband filter 545 to eliminate jitter due to random noise in the velocity signal. This signal in turn is sent through a saturation filter 546 which resolves a sign ambiguity at zero velocity and generates a constant positive or negative voltage depending on whether velocity is positive or negative. The output from the saturation filter 546 is then sent to gain 538 which converts the constant voltage to constant torque command for friction compensation. This command is added to the combined torque command for spring, damping and gravity stiffness compensation coming out of gain 537, along with a command offset 554 in adder 544. The combined signal output from adder 544 is sent to a saturator 547 which limits the torque command to motor A for safety purposes.

The particular components which can be implemented with a system made in accordance with the present invention can be relatively simple to design and build, and the actuator assemblies can be made with off the shelf components, including motors, bearings, and cables. Position, velocity and acceleration measurements can be obtained from angular position encoders that can be built into the motors, or can be separately and operatively connected with the motors. The signalling and control processes can be implemented on a dedicated computer work station using suitable computers or data processing equipment. For example, one of the torque motors that can be utilized in accordance with the present invention is a Robbins and Myers 4050 Brushless Servo System which can be used in a torque command mode as a parallel motor, or with a gear train as a position controlled motor. Furthermore, this particular motor has built-in sensors and electronics to send shaft angular displacement and velocity with sufficient accuracy. Torque ripple can be minimized. This particular motor can have cogging torques equal to 10-15% of the commanded torque and have unspecified friction torques. However, torque commands can be generated to at least partially compensate for these unwanted torques.

The torsion spring that can be utilized with the present invention should generally have adjacent coils which do not touch when the spring rotates. This particular spring design features a conical shape to reduce the tendency for the spring to buckle under stress.

While the particular actuator assemblies described herein utilizes a spool and motor arrangement, it should be appreciated that any suitable apparatus that is capable of actuating the cables can also be implemented without departing from the spirit and scope of the present invention.

The above described microgravity suspension system made in accordance with the present invention thus satisfies the need for improved suspension capabilities which also reduces the requirement for a large overhead clearance to suspend the test structure.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A microgravity suspension system for supporting a test article in a gravity field to simulate a weightless environment, comprising:

a support assembly attached to the test article for suspending the test article from an overhead support, said support assembly including three cables each having a first end attached to the test article, each of said cables being movably mounted on the overhead support and adapted to cooperatively maintain a constant resultant vertical force on the test article which is equal to the weight of the test article; and means operative with each cable for actively adjusting the force in each cable to continuously maintain the constant resultant vertical force on the test article as the position of the test article changes.

2. The microgravity suspension system as set forth in claim 1 wherein each first end of said cables is attached substantially at the same location on the test article and said cables extend from the overhead support to form an inverted tripod-like arrangement.

3. The microgravity suspension system as set forth in claim 1 wherein said force-adjustment means comprise:

an actuator assembly connected to each cable and mounted to the overhead support, each actuator assembly including:

a spool-like member attached to the free end of said cable for wrapping a portion of the cable therearound;

means connected to said spool-like member for supporting the weight carried by said cable when the test article is at a rest position;

means connected to said spool-like member for applying a torque to said spool-like member for varying the force in said cable;

means for sensing and measuring the rotation of the spool-like member; and control means operatively associated with each actuator assembly for computing changes in the position of the test article determined by measurement of the rotation of each spool-like member, said control means being adapted to compute torques to be applied to each spool-like member in response to changes of the position of the test article to maintain the constant resultant vertical force on the test article and to control each torque applying means to apply the correct amount of torque to each of said spool-like members.

4. The microgravity suspension system as set forth in claim 3 wherein said torque applying means comprise a control motor attached to said spool-like member and said means for supporting the weight of the test article at a rest position comprise a bias applied to said motor to produce the force in the cable needed to support the test article.

5. The microgravity suspension system as set forth in claim 3 wherein said means for supporting the weight of the test article at a rest position comprise spring means attached to said spool-like member.

6. The microgravity suspension system as set forth in claim 5 wherein said torque applying means comprise a motor connected to said spool-like member.

7. The microgravity suspension system as set forth in claim 5 wherein said torque applying means comprise a position controlled motor attached in series to said spring means.

8. The microgravity suspension system as set forth in claim 7 wherein said spool-like member has a first and second end, said first end being attached to said spring means and second end being attached to a torque motor.

9. The microgravity suspension system as set forth in claim 1 wherein said force adjustment means comprise:
means for determining the position of the test article as it moves from one position to another;
means for calculating the force required in each of the cables at each new position to maintain the constant resultant vertical force on the test article; and
means for actuating the cables to develop the required force in each of said cables.

10. A microgravity suspension system for supporting a test structure in a gravity field to simulate a weightless environment, comprising:
a plurality of support assemblies attached to the test structure for suspending the test structure from an overhead support, each said support assembly including three cables each having a first end attached to the test structure, each of said cables being movably mounted on the overhead support and adapted to cooperatively maintain a constant vertical force on the test structure which is equal to the weight of the test structure;
means operative with each cable for actively adjusting the force in each cable to continuously maintain the constant vertical force on the test structure as the position of the test structure changes; and
means for controlling each of said force-adjusting means to maintain the constant resultant vertical force on the test structure.

11. The microgravity suspension system as set forth in claim 10 wherein said force adjusting means comprise:
means for determining the position of the test structure as it moves from one position to another to establish position data;
means for transferring the position data to said control means;
means for receiving force command signals from said control means;
means for actuating the cables in response to the torque command signals to develop the required forces in each of said cables.

12. The microgravity suspension system as set forth in claim 11 wherein said control means comprise:
means for receiving position data from said position data transferring means;
means for computing force commands that maintain the constant resultant vertical force on the test structure for each cable of the support assemblies and;
means for transferring said force commands to said force command receiving means.

13. A method of suspending a test article in a gravitational environment to simulate a weightless environment, comprising the steps of:
suspending the test article from a support assembly having three cables, each having one end attached to the test article;
supporting the test article by said support assembly to maintain a constant resultant vertical force equal to the weight of the test article;
measuring the change of position of the test article as it moves from one position to another;
calculating the required force in each of the cable at each new position to maintain the constant resultant vertical force on the test article; and
actuating each of said cables in order to develop the required cable force needed to maintain the constant resultant vertical force on the test article.

14. A method of suspending a test structure in a gravitational environment to simulate a weightless environment, comprising the steps of:
suspending the test structure from a plurality of support assemblies, each having three cables having one end attached to the test structure;
supporting the test structure by said plurality of support assemblies to maintain a constant resultant vertical force equal to the weight of the test structure at each of the attachment points;
measuring the change of position of the test structure as it moves from one position to another;
calculating the required force in each of the cables at each new position to maintain the constant resultant vertical force on the test structure; and actuating each of said cables in order to develop the required cable force needed to maintain the constant resultant vertical force on the test structure.

* * * * *